Patented May 21, 1940

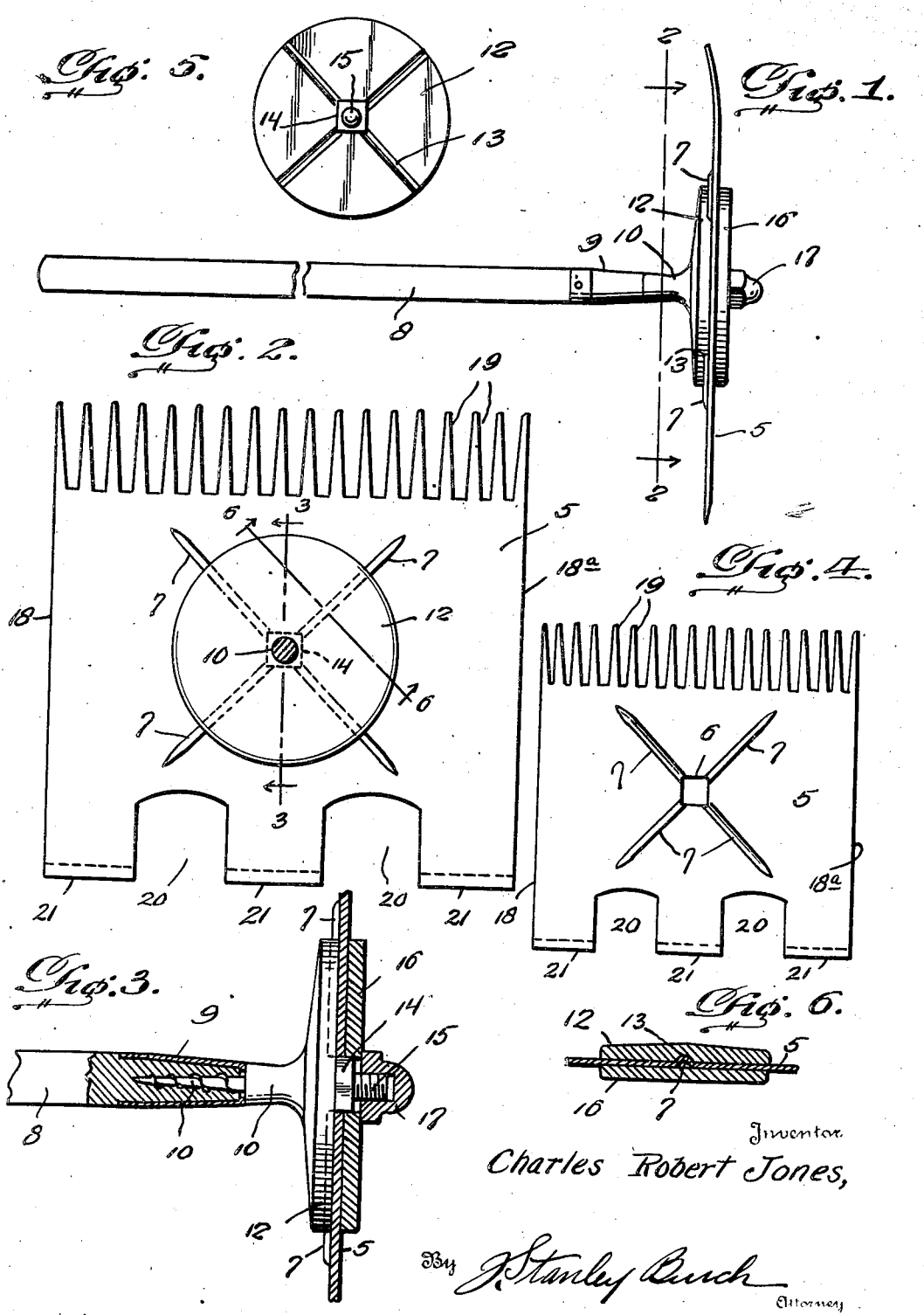

2,201,436

UNITED STATES PATENT OFFICE 2,201,436

HOE

Charles Robert Jones, Rossville, Ga.; Charles Robert Jones, Jr., administrator of said Charles Robert Jones, deceased Application March 13, 1937, Serial No. 130,788

1 Claim. (Cl. 306—26)

This invention relates to a hand cultivating tool of the hoe type, wherein the handle is attached to the blade substantially centrally of the latter so as to provide a tool which is of extremely rigid and durable construction with all of the edges of the blade available for selective use.

The present invention is especially suitable in the construction of a hoe having a compound blade, and the primary object of the present invention is to provide simple and efficient means for detachably securing the blade to the handle so that the blade is effectively braced against bending or breaking strains, and so that any one of a number of different compound blades may be readily interchangeably used with the handle.

Another object of the present invention is to provide means for firmly attaching the blade to the handle so that turning or rotation of the blade with respect to the handle is effectively prevented, in addition to bracing the blade against bending or breaking strains.

The present invention consists in the novel form, combination and arrangement of parts hereinafter more fully described, shown in the accompanying drawing and claimed.

In the drawing:

Figure 1 is a side elevational view, partly broken away, of a hoe constructed in accordance with the present invention.

Figure 2 is a transverse section on line 2—2 of Figure 1.

Figure 3 is a fragmentary longitudinal section on line 3—3 of Figure 2.

Figure 4 is a rear elevational view of the blade forming part of the hoe shown in Figures 1 to 3 inclusive.

Figure 5 is a front elevational view of the flanged shank forming part of the blade attaching means of the hoe shown in Figures 1 to 3 inclusive; and Figure 6 is a fragmentary section on line 6—6 of Figure 2.

Referring in detail to the drawing, the present hoe includes a blade 5 having a central square opening 6 and provided on its rear face with elongated ribs 7 which radiate from the central opening 6.

The hoe also includes an elongated wooden handle 8 having a ferrule 9 fitted on the forward end thereof. For securing the blade 5 to the handle 8, I provide a metal shank 10 having an integral axial threaded stem 11 projecting from the rear end thereof and threaded into the forward end of the handle 8 so that the shank 10 is securely attached to the handle, the ferrule 9 preventing splitting of the forward end of the handle 8 when the stem 11 is threaded into the same. Formed on the forward end of shank 10 is a relatively large disk or plate 12 having radial grooves 13 in the front face thereof adapted for snug reception of the ribs 7 of blade 5. Projecting forwardly from the plate 12 is a stem having a square inner or rear portion 14 and a reduced threaded forward or outer end portion 15. The square portion 14 is of a size to snugly fit in the square central opening 6 of the blade 5, and arranged against the front or forward face of blade 5 is a relatively large disk 16 having a square central opening also snugly receiving the square stem portion 14. The disk 12, blade 5 and disk 16 are secured in tightly compacted relation by means of a nut 17 threaded onto the stem portion 15 and against the forward side of disk 16. The square stem portion 14 fitting in the square central openings of the blade 5 and disk 16 effectively prevents turning or rotation of these parts 5 and 16 relative to the shank 10 about an axis coincident with the axes of shank 10 and handle 8. Such turning of blade 5 relative to shank 10 is additionally restrained by the interlocking engagement of the blade 5 with the disk 12 through the medium of the ribs 7 engaging in the grooves 13. It will be noted that the disks 12 and 16 are relatively large so that the major central portion of the blade 5 is clamped therebetween, thus insuring efficient bracing of the blade 5 against bending or breaking strains. While the grooves 13 are shown as provided in the disk 12, it is obvious that they may be provided in the disk 16, in which case the blade 5 may be reversed so that the ribs 7 will engage in the grooves regardless of which disk is formed with the latter.

The blade 5 may be any one of several different types well known in the art. The essential consideration is that the handle is attached to the blade substantially centrally of the latter so that any desired one of the plurality of edges of the blade may be selectively used. The blade shown has two straight edges 18 and 18a which may be selectively employed for ordinary hoeing operation. Still another edge is formed with a plurality of teeth 19 so that this edge may be utilized as a rake. The remaining edge has a plurality of relatively wide notches or cutouts as at 20 defining a plurality of spaced sharpened blade portions 21, so that this edge may be effectively employed for cotton chopping operations. Obviously, a set of different types of blades may be provided so that any one of them may be selectively used, the blades being readily interchangeable when detachably fastened to the handle as and by the means illustrated and described.

From the foregoing description, it is believed that the construction and advantages of the present invention will be readily understood and appreciated by those skilled in the art.

What I claim as new is:

A hand hoe including a compound blade having a plurality of working edges and provided with a polygonal central opening and ribs on one face thereof radiating from said opening, a shank provided at one end with means for attaching the same to a handle and formed at the opposite end with a relatively large bracing plate contacting the major central portion of the inner surface of said blade and a central polygonal stem projecting forwardly from said plate and fitting in the polygonal central opening of said blade, said stem having a reduced cylindrical threaded outer end portion, a second relatively large bracing plate arranged on said stem and contacting the major central portion of the outer surface of the blade, said second plate having a polygonal central opening in which said polygonal stem is also fitted, one of said plates having radiating grooves receiving said ribs of the blade, and a nut threaded on the outer end portion of said stem for securing the plates and blade in compacted relation.

CHARLES ROBERT JONES.